United States Patent
Evalds

[15] 3,684,172
[45] Aug. 15, 1972

[54] THERMOCOUPLE TEMPERATURE CONTROL SYSTEM

[72] Inventor: Egils Evalds, 124 Linwood Ave., Ardmore, Pa. 19003

[22] Filed: Oct. 8, 1970

[21] Appl. No.: 79,048

[52] U.S. Cl. ..................236/78, 73/359, 219/510, 317/133.5, 330/143
[51] Int. Cl. ...........................................G05d 23/22
[58] Field of Search ......317/133.5; 219/510; 236/78, 236/78 D, 15 B; 431/80; 73/359, 360, 341; 340/22 E; 330/143

[56] References Cited

UNITED STATES PATENTS

| | | | |
|---|---|---|---|
| 2,730,618 | 1/1956 | Michaels | 236/78 D |
| 3,538,355 | 11/1970 | Grindheim et al. | 73/359 |
| 2,945,184 | 7/1960 | Anderson et al. | 236/78 UX |
| 3,236,451 | 2/1966 | Josephs | 236/68 |

*Primary Examiner*—William E. Wayner
*Attorney*—William E. Cleaver

[57] ABSTRACT

The present system provides a circuit wherein a direct-current amplified difference signals is produced in response to an extremely small difference signal being developed by comparing the small voltage developed across a thermocouple, (acting as a temperature sensor) aNd a selectable variable voltage representing the desired temperature of the location being monitored. The amplified direct-current difference voltage is attenuated and fed back to an operational amplifier to develop a stable difference signal input thereto. In addition, the amplified direct-current difference voltage is applied to the control element of a switching circuit. The switching circuit has a pulsating direct-current signal applied to the input-output elements and switches to turn on the heating means in response to the value of the applied difference signal (which is applied to the control element) exceeding a predetermined percentage of the value of the applied pulsating direct-current signal.

7 Claims, 1 Drawing Figure

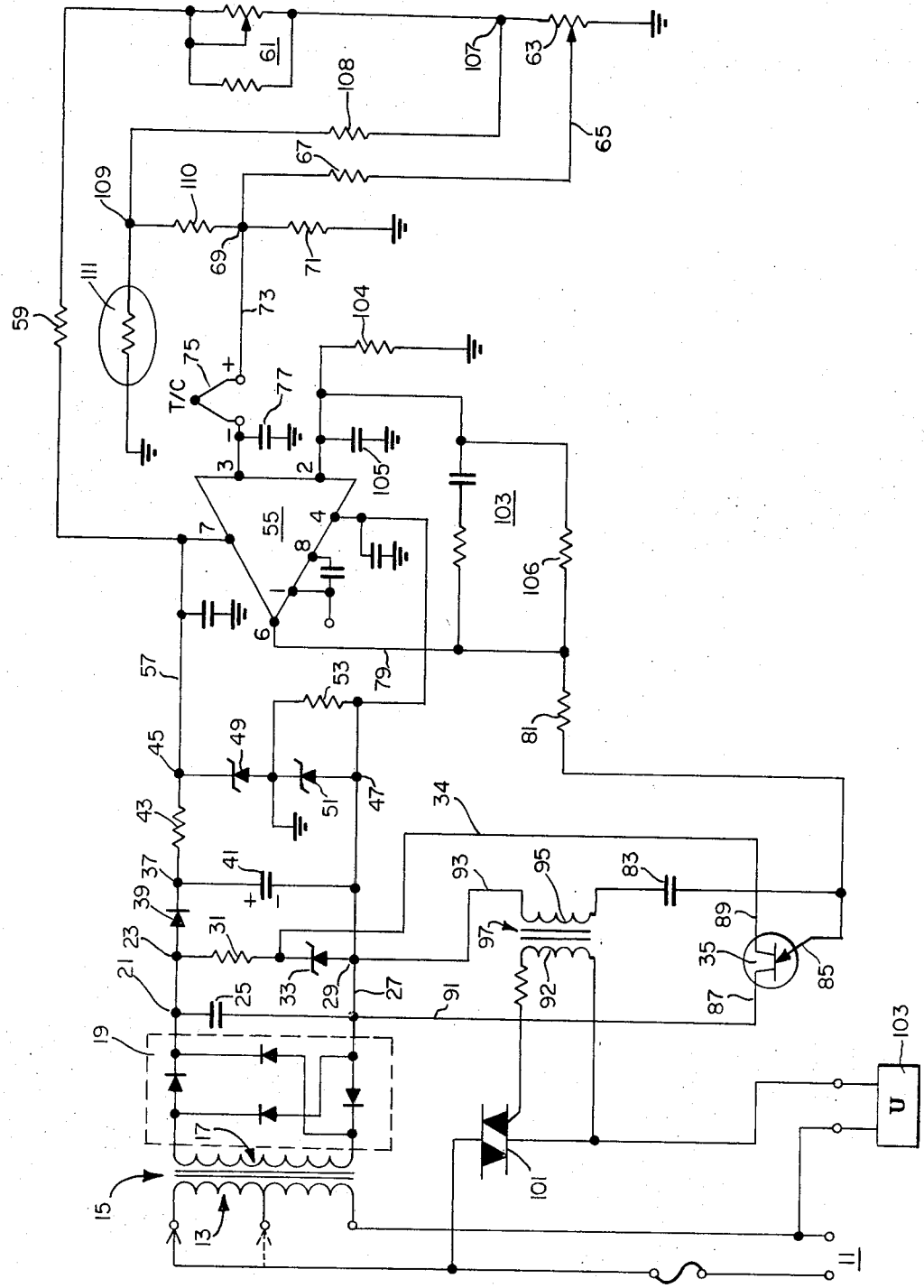

THERMOCOUPLE TEMPERATURE CONTROL SYSTEM

BACKGROUND AND SUMMARY

In temperature control circuits of the prior art, it has been the custom to provide a bridge circuit with a temperature sensitive device being employed in one of the legs thereof and a variable resistor, which sets the value of the error signal of the bridge, being employed in another leg of the bridge. The error signal of such a circuit is normally used to fire some trigger circuitry which ultimately turns on or turns off a heating device. These systems have functioned quite satisfactorily but they are costly compared to the present system which employs a thermocouple. For example, the bridge circuit per se is costly by comparison; the stabilizing circuits normally used with the bridge circuit are costly by comparison; and the anticipatory circuit (i.e. the inertia compensating circuit) for the bridge circuit by comparison is normally costly. The use of a thermocouple as a temperature sensing device basically enables the present circuit to be less costly than prior art circuits. While the use of a thermocouple as a temperature responsive device has been known, the use of the thermocouple as a sensor in such circuits as the prior art circuits has not been employed readily because the voltage generated by the thermocouple is small. Accordingly it has been the practice heretofore to employ complicated electromechanical systems and/or delicate electromechanical devices to handle these small voltages. These devices and systems have always had some fragile aspect and therefore have not been usable in any mode of operation which would subject the system to vibrations or rugged use. The present circuit is a solid state system employing no mechanical devices. The present circuit directly compares the thermocouple voltage with a selected voltage value by solid state electronics. This design reduces the cost and enables the system to be used in rugged modes of operation. In the present circuit, the amplified difference signal is constantly present but is rendered ineffective until sometime after the start of a half cycle of the voltage source signal being applied to the system (the pulsating direct-current signal). The effective difference signal or the switching circuit control signal is developed in a linear fashion so that the time that the heater is turned on can be incremental and quite predictable. The circuit employs a number of components which are used in a double duty roll and the circuit design requires relatively few components for its overall operation. Accordingly, the present circuit provides a reliable temperature control circuit usable in a rugged mode of operation and available at a relatively lower cost.

The objects and features of the present invention will become apparent in accordance with the discussion to follow taken in conjunction with the drawing.

Consider the drawing wherein there is found a power source 11 which provides an alternating-current signal to the primary winding 13 of the transformer 15. The secondary winding 17 of the transformer 15 accordingly provides an alternating-current signal to the full wave rectifier 19. The alternating-current signal on the secondary winding 17, being full wave rectified, is transformed into a pulsating direct-current signal at the terminals 21 and 23. The capacitor 25 is employed to simply bypass any high frequency signals and is not a very large capacitor. It will be noted that the other side of the capacitor 25 is tied to the return line 27 which is connected to the other side of the secondary winding 17. Connected across the points 23 and 29 is a resistor 31 in series connection with a Zener diode 33. The Zener diode 33 is chosen in the preferred embodiment to have a breakdown value of ten volts and accordingly there is a clipped wave, or a substantially square wave, developed on the line 34, when the pulsating direct-current signal appearing at point 23 exceeds 10 volts. This substantially square wave is applied to one of the terminals of the unijunction transistor 35. Returning now to a consideration of the input line or upper line, we find that the point 23 is connected to the point 37 by means of a diode 39 which acts in conjunction with the capacitor 41 and the resistor 43 to integrate the pulsating direct-current signal and provide a substantially non-pulsating direct-current signal at the terminal 45.

Connected across the terminals 45 and 47 is a pair of Zener diodes 49 and 51. It will be noted that the Zener diodes 49 and 51 are connected in series and that their midpoint is connected to ground. The Zener diodes 47 and 51 in the preferred embodiment are chosen to have breakdown characteristics at 10 volts and hence the voltage difference between the points 45 and 47 is 20 volts. Since the midpoint between the Zener diodes 49 and 51 is tied to ground it becomes apparent that the point 45 is held at plus 10 volts and the point 47 (the return line 27) is held at minus 10 volts when the circuit is in operation.

Accordingly, it becomes apparent that the bias across the operational amplifier circuit 55 as applied to the terminals 4 and 7 thereof is 20 volts. It further follows that the output of the operational amplifier 55 as it appears at terminal 6 can swing from zero volts to plus 20 volts. The operational amplifier 55 is a standard operational amplifier having a positive and a negative input respectively at the terminals 2 and 3 and is commercially designated as a Fairchild 709 (although other commercial types can be used). When the circuit is in operation, there is current flow from the terminal 45 along the line 57 through the resistor 59, through the resistor network 61, through the variable resistor 63 to ground. The variable resistor 63 is actually a dial-type device wherein the desired temperature can be set and the setting thereof effects an adjustment of the variable resistor 63. The resistor network 61 is a trimming network for adjusting the scale of operation of the adjustable resistor 63. The resistor 59, resistor network 61, and adjustable resistor 63 make up a voltage divider network. However it should be understood that other forms of voltage divider networks can be used.

A certain voltage is tapped from the adjustable resistor 63 in accordance with the setting of the dial and therefore there is current flow through a voltage comparison circuit, i.e. along the line 65, through the resistor 67, to the terminal 69. It should be understood that other forms of voltage comparison circuits can be employed. The current flow from the terminal 69 goes along two paths; the first path being through the resistor 71 to ground and the other path being along the line 73 through the thermocouple 75 to the capacitor 77. The other side of the capacitor 77 is tied to ground and hence the capacitor 77 becomes charged with a polarity as hereinafter discussed.

The thermocouple 75 will produce a voltage as shown in accordance with the amount of heat to which the monitored device is subjected. Hence the thermocouple 75 acts as a battery which is attempting to provide current flow along the line 73, through the resistor 71 to ground, back to the lower side of capacitor 77 (and by charging the capacitor) to the other side of the thermocouple. On the other hand, the positive voltage provided at terminal 69 attempts to provide current flow along the line 73, through the thermocouple 75, to the capacitor 77 with the other side of the capacitor being tied to ground. Accordingly there are bucking voltages in the circuit at this juncture with one voltage being provided from the variable resistor 63 and the other voltage being provided by the thermocouple 75. The resistor 67 is chosen to be a high ohmic valued resistor so that the vast majority of the voltage drop occurs across that resistor. Hence the voltage developed at terminal 69 closely approaches the voltage generated by the thermocouple. In other words the bucking voltages are in the millivolt range. It should be apparent that if the thermocouple is exceedingly hot and it generates a relatively large difference of potential with the polarities shown, the difference voltage applied to terminal 3 of the operational amplifier 55 will be negative. On the other hand, if the thermocouple is relatively cold then the difference of potential which is generated by the thermocouple will be in a low order of millivolts and hence will be bucked out by the voltage appearing at the terminal 69 and there will be a positive voltage applied to the terminal 3.

In the preferred embodiment, the operational amplifier 55 is of such a characteristic that if there is no difference voltage applied between the terminals 2 and 3, there will be a ten volt output signal appearing at the terminal 6 (when compared to the return line which is setting at minus 10 volts). Actually the output under the above condition is zero volts but when compared to the minus 10 volts of the return line 27 provides a plus 10 volts across the capacitor 83. It should also be understood that the operational amplifier 55 (in the preferred embodiment) is capable of amplifying the input signal by some 100,000 times.

Assume for the moment that there is no difference signal applied at the terminals 2 and 3 of the operational amplifier 55 and that therefore there is a 10 volt output signal occurring at point 6 with respect to line 27. The 10 volt signal will provide current flow along the line 79 through the resistor 81 to charge up the capacitor 83. The voltage across the capacitor 83 will also be applied to the control element 85 of the unijunction transistor 35. As mentioned above the return line 27 is held at minus 10 volts, in the preferred embodiment, because of the 20 volt drop across the terminals 45 and 47 through the serially coupled Zener diodes 49 and 51. Accordingly, the terminal 87 of the unijunction transistor 35 is held at minus 10 volts. It will also be recalled that the line 34 has a substantially square wave developed thereon whose amplitude value was at plus 10 volts and this signal is applied to the terminal 89 of the unijunction transistor. It further becomes apparent that when there is a 10 volt output signal (with respect to line 27) at point 6 of the operational amplifier 55 and the lower side of the capacitor 83 is connected to the minus 10 volt line 27, that the capacitor 83 will tend to be charged to 20 volts. Let us assume that the unijunction transistor 35 conducts or "fires" when the voltage applied to the control element 85 is 15 volts or 75 percent of the voltage across the terminals 87 and 89. It follows that when the capacitor 83 has been charged to 15 volts the unijunction transistor 35 will conduct thereby discharging the capacitor 83 through the unijunction transistor 35, along the line 91, along the line 93 to the other side of the capacitor 83. It should be apparent that when the capacitor 83 discharges there is current flow through the primary winding 95 of the transformer 97 and hence there is an induced voltage in the secondary winding 99. The induced voltage in the secondary winding 99 will cause the triac 101 to fire and hence provide power to the utility device 103.

It should be understood that the thermocouple 75 is located somewhere in close proximity to the utility device 103 because this is the device that is being monitored. It also should be understood that the triac 101 acts like a thyratron, or a silicon controlled rectifier, in that once it is fired it will continue to conduct until the voltage applied to its anode and cathode has been diminished.

To recap then, when the capacitor 83 has been charged to a predetermined percentage of the value of the voltage between the elements 87 and 89, the unijunction transistor 35 will conduct thereby discharging the capacitor 83 and thereby developing a bias across the triac 101 to fire it.

It should be understood that although the example was based on a ten voltage output of the operational amplifier 55, (and other values), these values are not critical and different values could be employed.

Continuing with our set of parameters and examples, consider that the input to the terminal 3 of the operational amplifier 55 is negative and therefore the output at the terminal 6 is something less than 10 volts, then the amount of time necessary to charge the capacitor 83 to 15 volts will be a longer period of time than would have been necessary if the output from the operational amplifier 55 had remained at 10 volts. It will be recalled that the ground rules we mentioned earlier were that if the thermocouple 75 was very hot a large negative voltage would be produced and hence it follows that we would like the triac 101 to be turned on at a later period in the cycle (in a "hot" condition) so that a lesser amount of heat will be provided to the utility device 103. It becomes apparent that the system works as it should since the negative voltage developed by the thermocouple provides a more negative voltage at the output 6 than the ten volts of the previous example and therefore a longer period of time will be necessary to charge the capacitor 83. Since the capacitor 83 takes a longer period of time to charge, the triac will be turned on at a later time in the applied voltage cycle.

Consider the contrary i.e. if there is a positive signal developed at point 3 because the thermocouple is relatively cold. The output voltage at point 6 will be higher than 10 volts and the capacitor 83 will be charged at an earlier time than it was under the example of the ten volt output from the operational amplifier 55. Under these circumstances, of course, the unijunction transistor 35 will fire earlier and therefore the triac will be turned on earlier in the cycle to provide power to thus heat the utility device 103.

The output from the operational amplifier 55 is fed back from the terminal 6 through the resistor network 103, across the resistor 104 to ground, and at the same time to charge the capacitor 105. The resistor 106 is a large resistor so that the fed back signal is relatively small and indeed is in the order of the signal generated by the thermocouple 75. Hence there is a very small difference signal applied between the terminals 2 and 3. The behavior of the operational amplifier depends upon this difference signal. The difference signal developed between the points 3 and 2 will follow the voltage generated by the thermocouple and therefore in effect it is the difference signal between the thermocouple and point 69 which controls the output at the terminal 6.

The voltage generated by the thermocouple 75 is proportional to the temperature difference between the hot junction (measuring end which is not connected to the leads) and cold junctions (connected to the leads). Hence it would be desirable to provide a compensating circuit which would take into account the error which may occur if the cold junctions' temperatures increase. For this reason there is a circuit connected to the terminal 107 which includes the resistor 108 connected to the terminal 109. The circuit is connected from the terminal 109 through the resistor 110 and on a second path through the thermistor 111 to ground. A higher voltage signal appears at terminal 107 than appeared at the tap of the adjustable resistor 63 and this higher voltage provides current through the resistor 108 which is a high ohmic valued resistor to provide a major voltage drop thereacross. Accordingly, there is a relatively small voltage developed at terminal 109 and this provides current therefrom across the resistor 110 which raises or lowers the voltage at the point 69. If the cold junctions of thermocouple 75 are hot then the thermistor 111 which is located in close proximity thereto also will be hot and will provide a very low resistance so that the parallel resistance network made up of the thermistor 111 and the resistors 110 and 71 is reduced. Accordingly, the voltage at point 69 is reduced from what it would have been had there been a larger resistance for the parallel network. Since the thermocouple under these last mentioned conditions is not providing the voltage that it would have provided had the cold end junctions been at normal temperatures, the voltage against which it is compared, as it appears at point 69, has been reduced and hence the net effect is to provide a difference voltage which follows a linear operation. If on the other hand, conditions are cool at the "cold" connections so that the thermistor 111 provides a relatively high resistance, then the parallel resistance network has a relatively high resistance to raise or normalize the voltage at point 69, but under these circumstances the thermocouple cold end is in the normal range of its operation and is providing the value of bucking voltage that it should to make the proper comparison with the voltage developed at point 69.

What is claimed is:

1. A thermocouple temperature control system comprising in combination:
   a voltage source;
   a voltage divider network coupled to said voltage source;
   a voltage comparison circuit connected to said voltage divider network to provide at a first terminal a voltage signal having a first polarity;
   a thermocouple connected to said first terminal so that the voltage generated by said thermocouple acts in opposition to said voltage signal having said first polarity thereby producing a difference signal at a first terminal of said thermocouple;
   signal amplifier means connected to said first terminal of said thermocouple to receive said difference signal and in response thereto to provide an amplified output signal;
   switching means connected to said amplifier means to receive said amplified output signal, said switching means formed to switch in response to said output signals; and
   heating means connected to said switching means to produce heat in response to said switching means being switched.

2. A thermocouple temperature control system according to claim 1 wherein said voltage divider network includes resistors therein which provide said voltage signal at said first terminal in the milli-volt range.

3. A thermocouple temperature control system according to claim 1 wherein said amplifier means includes an operational amplifier having an output terminal, first and second input signal means and first and second bias means and wherein said first input signal means is coupled to said first terminal of said thermocouple and wherein there is a feedback network connecting said output terminal to said second input signal means.

4. A thermocouple temperature control system according to claim 3 wherein said switching means includes a unijunction transistor having an input element, an output element and a control element and wherein said control element is connected to said output terminal of said operational amplifier.

5. A thermocouple temperature control system according to claim 4 wherein said switching means includes a pulse transformer having a primary winding and a secondary winding, a capacitor connected between one terminal of the primary winding of said pulse transformer and said control element, circuitry means connecting the other terminal of the primary winding of said pulse transformer to the output element of said unijunction transistor and wherein said switching means includes an electronic switching means connected across the secondary winding of said pulse transformer so that when said capacitor is charged to a predetermined value said unijunction transistor conducts thereby discharging said capacitor while simultaneously inducing a voltage in said secondary winding to fire said electronic switching means and further wherein the heating means is connected to said electronic switching means.

6. A thermocouple temperature control system according to claim 3 wherein the said first and second bias means of said operational amplifier are connected to said power source across first and second series connected Zener diodes and wherein the center point of said serially connected Zener diodes is connected to ground so that one bias means of said operational amplifier is connected to a voltage higher than ground and wherein said bias means of said operational transformer is connected to a voltage input whose value is less then ground.

7. A thermocouple temperature control system according to claim 1 wherein there is further included a compensating voltage divider network connected to said first voltage divider network wherein there is further included a temperature responsive device disposed in close proximity to said thermocouple and connected to said temperature compensating voltage divider network such that the voltage at said first terminal varies in accordance with the voltage across said temperature responsive device thereby causing the voltage at said first terminal to be responsive to the temperature condition of said thermocouple.

* * * * *